(12) United States Patent
Cordoba

(10) Patent No.: US 9,870,570 B2
(45) Date of Patent: Jan. 16, 2018

(54) METHOD TO NEGOTIATE FOR WIRELESS SERVICE

(71) Applicant: AT&T Intellectual Property I, LP, Atlanta, GA (US)

(72) Inventor: Juan Cordoba, Austin, TX (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 1130 days.

(21) Appl. No.: 13/947,607

(22) Filed: Jul. 22, 2013

(65) Prior Publication Data

US 2013/0304562 A1 Nov. 14, 2013

Related U.S. Application Data

(63) Continuation of application No. 11/350,580, filed on Feb. 9, 2006, now Pat. No. 8,521,544.

(51) Int. Cl.
*G06Q 30/00* (2012.01)
*G06Q 30/02* (2012.01)
*G06Q 40/04* (2012.01)

(52) U.S. Cl.
CPC ......... *G06Q 30/0207* (2013.01); *G06Q 30/02* (2013.01); *G06Q 40/04* (2013.01)

(58) Field of Classification Search
None
See application file for complete search history.

(56) References Cited

U.S. PATENT DOCUMENTS

| 2002/0065759 | A1 | 5/2002 | Boies et al. |
| 2002/0071416 | A1 | 6/2002 | Carlson et al. |
| 2003/0135740 | A1 | 7/2003 | Talmor et al. |
| 2004/0128197 | A1* | 7/2004 | Bam ...................... G06Q 30/02 705/14.17 |
| 2005/0137940 | A1* | 6/2005 | Lindsay ............. G06Q 30/0633 705/26.8 |

FOREIGN PATENT DOCUMENTS

| WO | 2001/98983 | 12/2001 |
| WO | 2002/095526 | 11/2002 |

OTHER PUBLICATIONS

"Attractive prizes in gel pen contest", New Straits Times, Kuala Lampur, Aug. 1, 2002, p. 4.
Fan, Maureen, "New York McDonald's Offering Wireless Internet to Little Appetite", Knight Rider Tribune Business News, Washington, Apr. 4, 2003, p. 1.

* cited by examiner

*Primary Examiner* — Paul R Fisher
(74) *Attorney, Agent, or Firm* — Guntin & Gust, PLC; Matthew Bruce Tropper

(57) ABSTRACT

A system and method are disclosed to negotiate for wireless services. A system that incorporates teachings of the present disclosure may include, for example, a method that operates in a communication device for commercially negotiating with a service provider for wireless services offered by way of a wireless access point (WAP) managed by the service provider. Alternatively, the system may include a method that operates in a wireless services management system (WSMS) for commercially negotiating with the communication device operated by the end user for wireless services offered by way of a WAP managed by the WSMS. Additional embodiments are disclosed.

20 Claims, 3 Drawing Sheets

METHOD TO NEGOTIATE FOR WIRELESS SERVICE

CROSS-REFERENCE TO RELATED APPLICATIONS

This application is a continuation of U.S. patent application Ser. No. 11/350,580 filed Feb. 9, 2006, which is incorporated herein by reference in its entirety.

FIELD OF THE DISCLOSURE

The present disclosure relates generally to negotiation techniques, and more specifically to a method to negotiate for wireless services.

BACKGROUND OF THE DISCLOSURE

There are a number of wireless services available to end users today including, for example, Wireless Fidelity (WiFi), cellular voice and data telephony, and wireless broadband services such as Evolution Data Optimized (EVDO) and Universal Mobile Telecommunications System (UMTS). As additional wireless services such as Worldwide Interoperability for Microwave Access (WiMAX), and/or Ultra Wide Band communications (UWB) are made available, an end user may be able to select and tailor services to his or her needs.

A need therefore arises for a method to negotiate for wireless services.

DETAILED DESCRIPTION OF THE DRAWINGS

Embodiments in accordance with the present disclosure provide a method to negotiate for wireless services.

In a first embodiment of the present disclosure, a computer-readable storage medium operates in a communication device having computer instructions for enabling communications with a wireless access point (WAP) conforming to one among IEEE's 802.11a, b, g, or n protocols, receiving a bidding price from an end user of the communication device for wireless services offered by way of the WAP, transmitting the bidding price to a wireless service provider managing the WAP, and receiving a first response from the wireless service provider.

In a second embodiment of the present disclosure, a computer-readable storage medium operates in a communication device having computer instructions for enabling communications with a WAP conforming to one among IEEE's 802.11 protocols, receiving an offer from a wireless service provider for wireless services offered by way of the WAP, and transmitting to the wireless service provider a response to the offer as directed by an end user of the communication device.

In a third embodiment of the present disclosure, a computer-readable storage medium operates in a communication device having computer instructions for enabling communications with a WAP, and commercially negotiating for wireless services between an end user of the communication device and a service provider managing the WAP.

In a fourth embodiment of the present disclosure, computer-readable storage medium operates in a WSMS having computer instructions for commercially negotiating wireless services offered by way of a WAP with a communication device operated by an end user.

In a fifth embodiment of the present disclosure, a computer-readable storage medium operates in a WAP having computer instructions for exchanging negotiation parameters between an end user of a communication device and a WSMS resulting in an agreement between the end user and the WSMS, and receiving instructions from the WSMS for enabling communications with the communication device according to the agreement.

In a sixth embodiment of the present disclosure, a method operates in a communication device for commercially negotiating with a service provider for wireless services offered by way of a wireless access point (WAP) managed by the service provider.

In a seventh embodiment of the present disclosure, a method operates in a WSMS for commercially negotiating with a communication device operated by an end user for wireless services offered by way of a wireless access point (WAP) managed by the WSMS.

Figure 1:
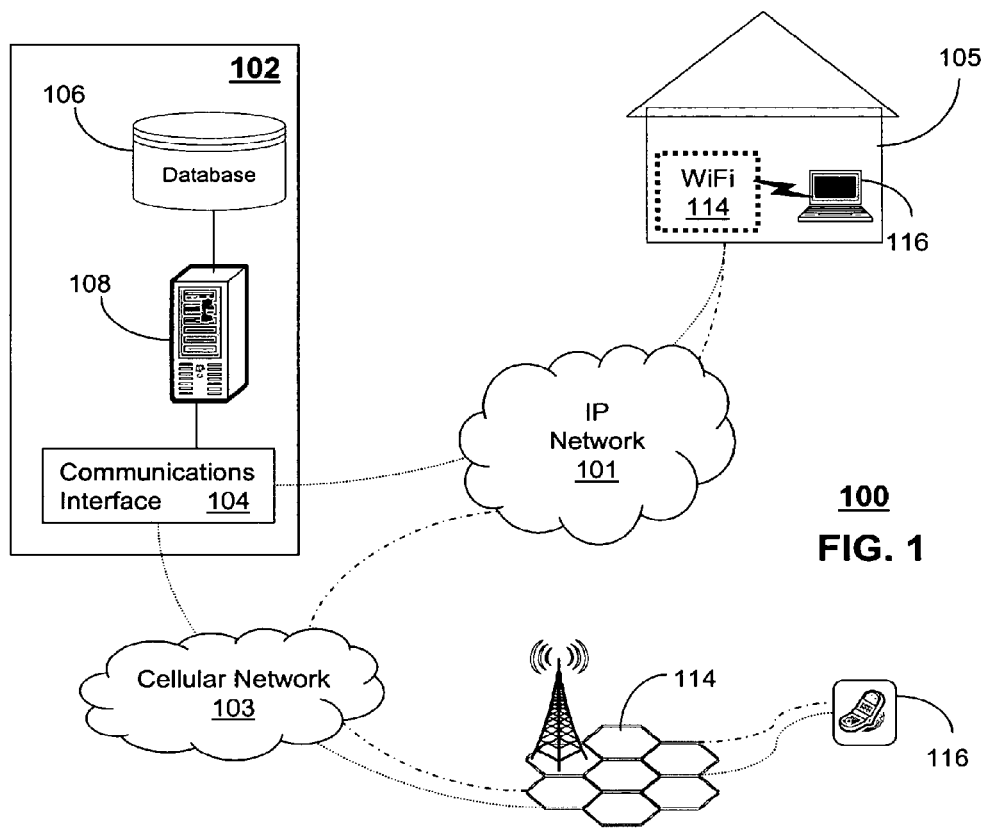
FIG. 1 depicts an exemplary embodiment of communication devices 116 communicating by way of wireless access points (WAPs) managed by a wireless services management system (WSMS), which collectively operate as a communication system.

FIG. 1 depicts an exemplary embodiment of communication devices 116 communicating by way of wireless access points (WAPs) 114 managed by a wireless services management system (WSMS) 102, which collectively operate as a communication system 100. The communication device 116 can represent any common computing device (e.g., a cellular phone or laptop) capable of communicating wirelessly with one or more WAPs 114 in the communication system 100. The WAPs 114 of FIG. 1 depict a number of possible embodiments including a plurality of cellular base stations supporting wireless voice and/or data communications in a cellular network 103, and/or one or more Wireless Fidelity (WiFi) access points operating in a commercial enterprise or residence 105.

The cellular network 103 can utilize circuit-switched technology that supports voice and data services such as GSM-GPRS, EDGE, CDMA-1x, EV/DO, UMTS, and other known and next generation cellular communications technologies. The cellular network 103 is coupled to the WAPs 114 under a frequency-reuse environment for communicating over-the-air with roaming communication devices 116. WiFi access points can conform to any one of IEEE's 802.11 present and next generation protocols (e.g., IEEE 802.11a, b, g, n and/or next generation technologies) that can operate individually or in a mesh network.

Alternatively, or in combination, other wireless access technologies can be applied to the present disclosure such as, for example, a Worldwide Interoperability for Microwave Access (WiMAX), ultra wide band (UWB), Bluetooth™, software defined radio (SDR) for accessing public and private communication spectrum with any number of communication protocols that can be dynamically downloaded over-the-air, cordless phone telephony, and other present and future generation wireless access technologies.

The communication system 100 can further comprise an IP (Internet Protocol) network 101 that couples the WSMS 102 to the WAPs 114 for carrying Internet traffic therebetween. The WSMS 102 can comprise a communications interface 104 that utilizes common technology for communicating over an IP interface with the IP network 101, and directly with the cellular network 103. By way of these interfaces, the WSMS 102 can control and manage the WAPs 114 operating in building 105 and the cellular network 103. The WSMS 102 utilizes a memory 106 (such as a high capacity storage medium) embodied in this illustration as a database, and a controller 108 that utilizes computing technology such as a desktop computer, or scalable server for controlling operations of the WSMS 102. As will be described shortly, the WSMS 102 can be programmed to manage wireless services offered to end users operating the communication devices 116 by way of the WAPs 114.

Figure 2:
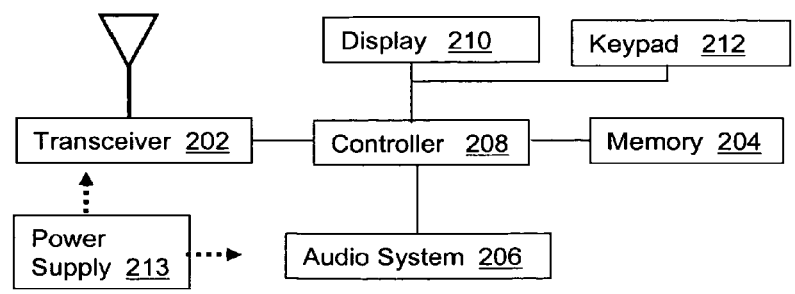
FIG. 2 depicts an exemplary embodiment of the communication device.

FIG. 2 is an exemplary block diagram of the communication device 116. In a first embodiment, the communication device 116 can include short range communications technology (e.g., a cordless phone) to support mobility within a small area such as the end user's residence or enterprise. Alternatively, the communication device 116 can be represented by a mobile device utilizing a wireless transceiver 202 that supports mid to long-range wireless communications with the WAPs 114 for exchanging voice and data messages with other targeted mobile devices in the communication system 100. Combinations of these embodiments, can also represent a multimode communication device (MCD). That is, when the MCD is within the premises of the building 105 it can function as a POTS cordless device or a VoIP device over WiFi, or Bluetooth™. When roaming outside the building 105, the MCD functions as a wireless communication device operating on the cellular network 103.

Each of the foregoing embodiments for communication devices 116 can utilize a memory 204, an audio system 206, and a controller 208 among other possible components. The memory 204 can comprise storage devices such as RAM, SRAM, DRAM, and/or Flash memories. The memory 204 can be external or an integral component of the controller 208. The audio system 206 can be utilized for exchanging audible signals with an end user. The communication device 116 can further include a display 210 for conveying images to the end user, a keypad 212 for manipulating operations of the communication device 116, and a portable power supply 213. The audio system 206, the display 210, and the keypad 212 can singly or in combination represent a user interface (UI) for controlling operations of the communication device 116 as directed by the end user. The controller 208 can manage the foregoing components with computing technology such as a microprocessor and/or digital signal processor.

Figure 3:
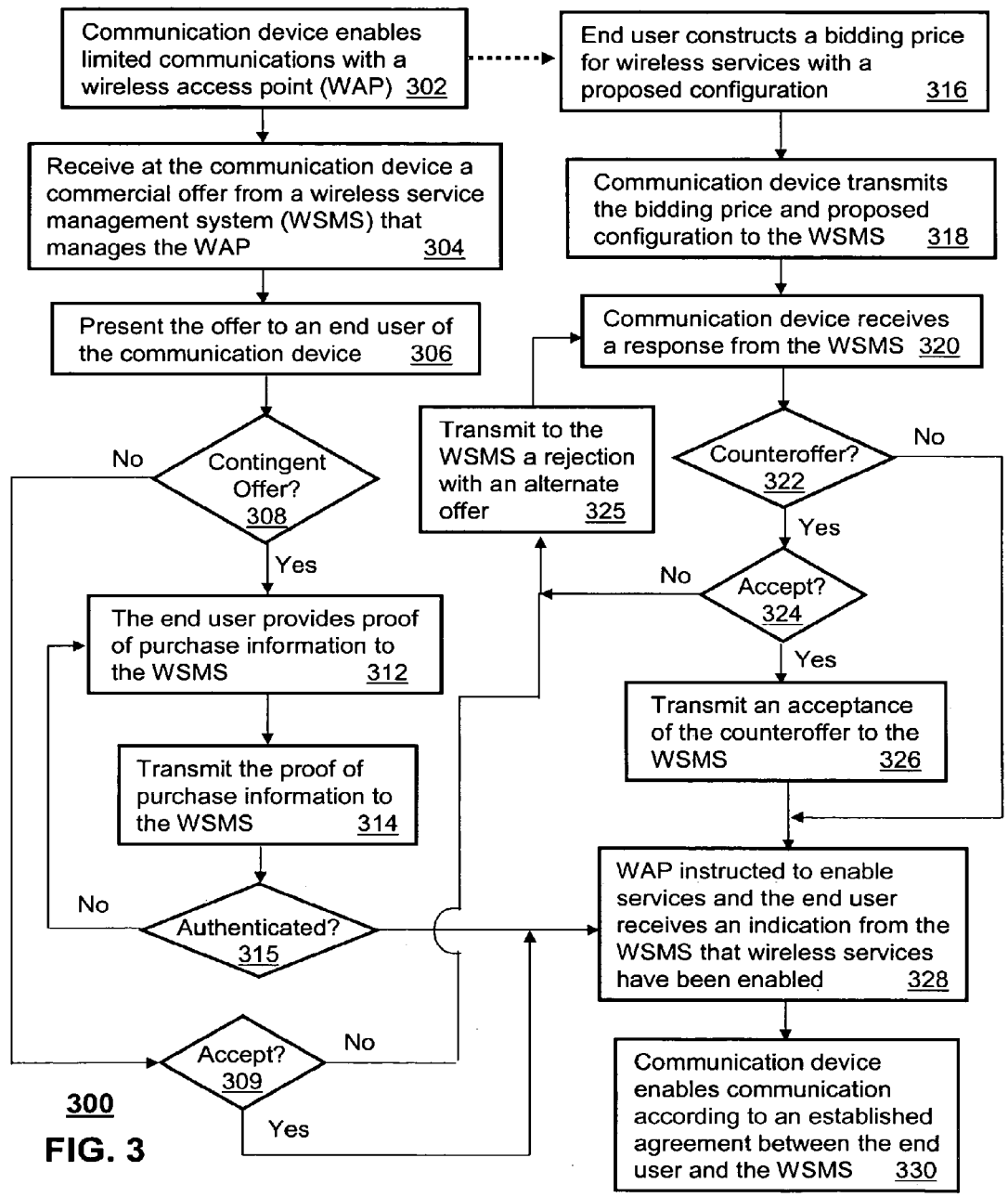
FIG. 3 depicts an exemplary method operating in portions of the WSMS, the communication device, and a corresponding WAP.

FIG. 3 depicts an exemplary method 300 operating in portions of the WSMS 102, the communication device 116, and a corresponding WAP 114. Method 300 illustrates alternative embodiments for negotiating services between the WSMS 102 and an end user of a communication device 116 that is seeking wireless services from a nearby WAP 114 managed by the WSMS 102. Accordingly, method 300 begins with step 302 in which a communication device 116 enables communications with a WAP 114. This step represents a preliminary step in the communications process. That is, in this step the communication device 116 performs a common process of authentication with the WAP 114 to acquire wireless services therewith. The WAP 114 in turn can be programmed to respond with a limited (or restricted) form of services until such time as the end user subscribes with the WSMS 102 for one or more services offered by way of the WAP 114.

Either of the WSMS 102 or the end user of the communication device 116 can proactively initiate negotiations for services. Step 304 illustrates the case where the WSMS 102 makes the first offer. In this step, the WSMS 102 transmits to the communication device 114 a commercial offer for wireless services that can be supplied by way of the WAP 114. In step 306 the offer is presented to the end user of the communication device 116 by way of, for example, the display 210. The commercial offer can be generated in accordance with business rules established by a service provider managing the WSMS 102. The offer can have any number of commercial embodiments. For instance, the offer can include a discounted base price for wireless services, free wireless services for a predetermined period, a rebate for wireless services, a coupon for wireless services, or combinations thereof each of which can also be made contingent on the end user purchasing one or more goods or services listed in the offer. In a commercial setting, for example, the WSMS 102 can offer the end user free wireless services upon proof of purchasing one or more goods or services of a particular kind or from a particular vendor having a value equal to or greater than a given total.

Upon the communication device 116 detecting a contingent offer in step 308, it proceeds to step 312 where the end user is prompted to provide proof of purchase information to the WSMS 102. The proof of purchases can include a proprietary or standard code imprinted on a merchant receipt such as a barcode or other coding scheme. The end user can enter in step 312 the code manually by way of the keypad 212 and/or audibly by way of the audio system 206 by which the controller 208 processes audio signals using common voice recognition technology. Once entered, the communication device 116 transmits in step 314 the code to the WSMS 102.

The WSMS 102 in response authenticates in step 315 the proof of purchase information with merchant information associated with one or more merchants listed in the offer. The WSMS 102 can accomplish this step by periodically monitoring or receiving merchant information from merchants having a commercial relationship with the service provider of the WSMS 102. The merchant information can include among other things the types of offers the merchants are willing to offer its patrons along with proof of purchase codes associated with the offers and/or codes associated with a consummated purchase made by its patron(s) that are transmitted in real-time to the WSMS 102.

Upon authenticating the proof of purchase(s) against the merchant information retrieved by the WSMS 102 in step 315, the WSMS 102 instructs in step 328 the WAP 114 to enable wireless services and to submit an indication that such services have been enabled for utilization by the communication device 116. The indication can be of any form of notification (e.g., a prompt that appears in the display 210 of the communication device 116) which informs the end user that the WSMS 102 has enabled wireless services for his or her use. Upon receiving the acceptance, the communication device 116 enables communications with the WAP 114 according to the agreement between the WSMS 102 and the end user. If, on the other hand, authentication fails, the WSMS 102 repeats the process by prompting the end user to reenter the proof of purchase(s) information in step 312.

Referring back to step 308, if the offer presented has no contingencies, the end user is prompted in step 309 to accept or reject the offer. An offer without contingencies can be represented by, for example, an offer for wireless services free of charge, or at a discounted rate. If the end user accepts the offer by way of the UI of the communication device 114, then the WSMS 102 instructs the WAP 114 to enable services and submit and indication of such action to the communication device 116 as described earlier in step 328 and 330.

If the end user rejects the offer, the communication device 116 transmits the rejection to the WSMS 102 in step 325. The rejection in this step may or may not include a counteroffer from the end user. If there is no counteroffer, the WSMS 102 processes the rejection, and if appropriate (in accordance with the business rules established by the service provider), submits a counteroffer to the end user of the communication device 116 for additional consideration. If, however, the end user submitted a counteroffer in step 325, the WSMS 102 processes the counteroffer and in step 320 either provides an acceptance, or rejection coupled with yet possibly another counteroffer.

With these possible scenarios in mind, in step 322, the communication device 116 evaluates whether the WSMS 102 has provided a counteroffer, or an acceptance to the end user's counteroffer in step 325. If the WSMS 102 rejects the end user's counteroffer and constructs yet another counteroffer, the communication device 116 in step 322 detects this new offer, and proceeds to step 324 where the end user is prompted to accept or reject the offer. If the offer is accepted by the end user, the communication device 116 proceeds to step 326 where it transmits the acceptance to the WSMS 102 which triggers steps 328 and 330 as described earlier. If the end user rejects the offer in step 324, the communication device 116 proceeds to step 325 where it submits to the WSMS 102 the rejection and a new counteroffer if one is provided by the end user, thereby repeating the aforementioned steps.

If, on the other hand, the WSMS 102 has submitted in step 320 an acceptance to the end user's counteroffer in step 325, the WSMS 102 instructs the WAP 114 in step 328 to enable services indicating such action to the communication device 116. The communication device 322 detects the acceptance in steps 320, 322, and 328 and proceeds to step 330 where it begins to utilizes the wireless services offered by way of the WAP 114 in accordance with the agreement between the WSMS 102 and the end user.

In yet another embodiment, the end user can take the proactive step of submitting a bid for services before the WSMS 102 has made an offer. In this embodiment, the communication device 116 proceeds from step 302 to step 316 after enabling limited communications with the WAP 114. In step 316 the end user constructs (or could have preprogrammed) a bidding price for wireless services which can be accompanied by a proposed configuration for such services. The proposed configuration can, for example, include desired service parameters such as speed of transmission, Quality of Service (QoS), security protection, roaming service, and so on.

In step 318, the communication device 116 submits the bidding price and proposed configuration to the WSMS 102. The WSMS 102 can in turn review the bidding price and configuration requested against common business and/or transactional rules established by the service provider of the WSMS 102. Once analyzed, the WSMS 102 can be directed by the business rules to submit an outright rejection of the end user's offer with a counteroffer, a partial rejection with a modified counteroffer, or an acceptance of all conditions set forth by the end user. Any of these results (or combinations thereof) can be submitted by the WSMS 102 in step 320 to the communication device 116 for presentation and evaluation by the end user.

As before, if the communication device 114 detects in step 322 a counteroffer, the communication device 116 proceeds to step 324 where the end user is prompted for a response which can consist of a rejection with or without a counteroffer, or an acceptance. If a rejection is submitted, step 325 is invoked according to the process flow described earlier. If the end user accepts a counteroffer from the WSMS 102 in step 324, the communication device 116 proceeds to steps 326 and 330. If the WSMS 102 responds in step 320 with an acceptance of the end user's proposed bidding price and configuration, the communication device 116 proceeds to the process flow beginning with step 328.

There are numerous embodiments that can be made part of the aforementioned disclosure that are not illustrated by method 300. For instance, the WSMS 102 can be replaced with a human agent who serves to process the aforementioned negotiations steps by of voice messaging, or data messaging (such as an instant messaging chat window presented by the display 210 of the communication device 116). Alternatively, the WSMS 102 can operate as an interactive voice response (IVR) system utilizing common voice recognition techniques, and/or Dual Tone Multi-Frequency (DTMF) signals that can be detected from depressions of the keypad 212 of the communication device 116.

Any of these embodiments can be made an integral part of method 300. It would also be evident to an artisan with ordinary skill in the art that any means for communicating negotiation terms between the end user of the communication device 116 and WSMS 102 (or a corresponding human agent) be applied to the present disclosure and thereby should be considered to be within the scope and spirit of the claims described below.

Figure 4:
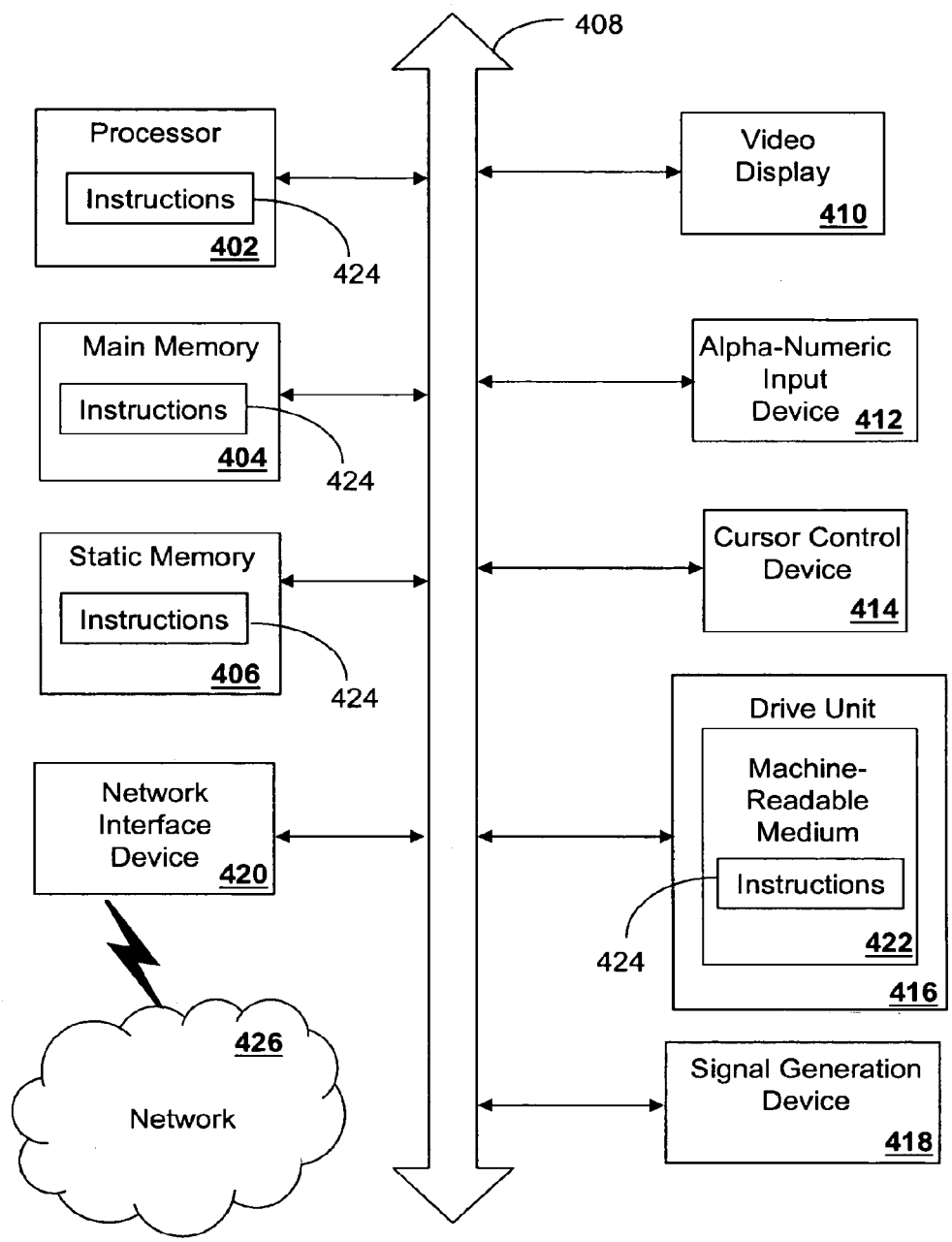
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device comprising computer instructions which, responsive to being executed by a mobile communication device, cause the mobile communication device to perform operations, the operations comprising:

transmitting a first wireless signal to initiate restricted wireless communications with a wireless access point conforming to a wireless protocol, the wireless access point providing wireless services in a commercial enterprise location of a particular merchant;

receiving, by way of the wireless access point, a second wireless signal comprising a first message that conveys an offer for the wireless services, the offer being contingent on a purchase of a particular good or service of a plurality of goods or services associated with the particular merchant of a plurality of different merchants;

receiving, by an audio system of the mobile communication device, an audible manifestation of a proof of purchase code;

performing voice recognition, by the audio system, on the audible manifestation of the proof of purchase code to produce an electronic manifestation of the proof of purchase code;

generating a second message, directed to a wireless services management server, wherein the second message includes the electronic manifestation of the proof of purchase code; and transmitting as a response to the offer a third wireless signal that conveys the second message to the wireless access point for delivery to the wireless services management server, wherein the transmitting of the response enables use of the wireless services by the mobile communication device, wherein the wireless services management server enables use of the wireless services according to monitoring of merchant information, wherein the merchant information is adjusted by equipment of the particular merchant based on a selection of target goods or services of the plurality of goods or services, and wherein at a time of transmitting the response, the selection of the target goods or services includes the particular good or service.

2. The storage device of claim 1, wherein the wireless protocol comprises one among IEEE's 802.11 protocols.

3. The storage device of claim 1, wherein the monitoring of the merchant information comprises periodically receiving the merchant information from the equipment of the particular merchant.

4. The storage device of claim 1, wherein the offer comprises free wireless services for a predetermined period.

5. The storage device of claim 1, wherein the offer comprises free wireless services at the commercial enterprise location.

6. The storage device of claim 1, wherein the proof of purchase code is imprinted on a receipt for the particular good or service.

7. The storage device of claim 1, wherein the operations include transmitting a proposed configuration for the wireless services to the wireless access point.

8. The storage device of claim 7, wherein the proposed configuration comprises a speed of transmission.

9. The storage device of claim 7, wherein the proposed configuration comprises a Quality of Service.

10. The storage device of claim 7, wherein the proposed configuration comprises security protection.

11. The storage device of claim 7, wherein the proposed configuration comprises a roaming service.

12. A method comprising:

transmitting, by a mobile communication device including a processor, a first wireless signal to initiate restricted wireless communications with a wireless access point conforming to a wireless protocol, the wireless access point providing wireless services in a commercial enterprise location of a particular merchant;

receiving, by the mobile communication device by way of the wireless access point, a second wireless signal comprising a first message that conveys an offer for the wireless services, the offer being contingent on a purchase of a particular good or service of a plurality of goods or services associated with the particular merchant of a plurality of different merchants;

receiving, by an audio system of the mobile communication device, an audible manifestation of a proof of purchase code;

performing voice recognition, by the audio system, on the audible manifestation of the proof of purchase code to produce an electronic manifestation of the proof of purchase code;

generating, by the mobile communication device, a second message, wherein the second message is directed to a wireless services management server, and wherein the second message includes the electronic manifestation of the proof of purchase code; and transmitting, by the mobile communication device, as a response to the offer a third wireless signal that conveys the second message to the wireless access point for delivery to the wireless services management server, wherein the transmitting of the response enables use of the wireless services by the mobile communication device, wherein the wireless services management server enables use of the wireless services according to monitoring of merchant information, wherein the merchant information is adjusted by equipment of the particular merchant based on selecting of target goods or services of the plurality of goods or services, and wherein at a time of transmitting the response, the selection of the target goods or services includes the particular good or service; and receiving, by the mobile communication device, a fourth wireless signal that conveys an indication that the wireless services have been enabled.

13. The method of claim 12, wherein the wireless protocol comprises one among IEEE's 802.11 protocols.

14. The method of claim 12, wherein a proposed configuration for the wireless services is communicated.

15. The method of claim 14, wherein the proposed configuration comprises a speed of transmission.

16. The method of claim 14, wherein the proposed configuration comprises a Quality of Service.

17. The method of claim 14, wherein the proposed configuration comprises security protection.

18. The method of claim 14, wherein the proposed configuration comprises a roaming service.

19. A mobile communication device, comprising:
a memory that stores computer instructions; and
a processor coupled with the memory, wherein the processor, responsive to executing the computer instructions, performs operations, the operations comprising:
transmitting a first wireless signal to initiate restricted wireless communications with a wireless access point conforming to a wireless protocol, the wireless access point providing wireless services in a commercial enterprise location of a particular merchant;

receiving, by way of the wireless access point, a second wireless signal comprising a first message that conveys an offer for wireless services, the offer being contingent on a purchase a particular good or service of a plurality of goods or services associated with the particular merchant of a plurality of different merchants;

receiving, by an audio system of the mobile communication device, an audible manifestation of a proof of purchase code;

performing voice recognition, by the audio system, on the audible manifestation of the proof of purchase code to produce an electronic manifestation of the proof of purchase code;

generating a second message, directed to a wireless services management server, wherein the second message includes the electronic manifestation of the proof of purchase code; and transmitting as a response to the offer a third wireless signal that conveys the second message to the wireless access point for delivery to the wireless services management server, wherein the transmitting of the response enables use of the wireless services by the mobile communication device, wherein the wireless services management server enables use of the wireless services according to monitoring of merchant information, wherein the merchant information is adjusted by equipment of the particular merchant based on selecting of target goods or services of the plurality of goods or services, and wherein at a time of transmitting the response, the selection of the target goods or services includes the particular good or service.

20. The mobile communication device of claim 19, wherein the operations include transmitting a bidding price and a proposed configuration for the wireless services to the wireless access point.

* * * * *